Jan. 17, 1928.

J. W. SCHWAB 1,656,504

METHOD OF TREATING SULPHUR

Original Filed Jan. 30, 1924

James W. Schwab INVENTOR

BY

Pennie, Davis, Marvin and Edmonds HIS ATTORNEYS

Patented Jan. 17, 1928.

1,656,504

UNITED STATES PATENT OFFICE.

JAMES W. SCHWAB, OF GULF, TEXAS, ASSIGNOR TO TEXAS GULF SULPHUR COMPANY, OF BAY CITY, TEXAS, A CORPORATION OF TEXAS.

METHOD OF TREATING SULPHUR.

Original application filed January 30, 1924, Serial No. 689,564. Divided and this application filed December 10, 1926. Serial No. 154,036.

This invention relates to the treatment of sulphur, and more particularly to the treatment of sulphur containing impurities, such as small amounts of organic impurities, the presence of which impart to the sulphur an abnormal color or other objectionable property. The invention has for its object the provision of an improved method of treating such sulphur to improve its color and to ameliorate its other objectionable properties.

This application is a division of my co-pending application Serial No. 689,564, for the method of treating sulphur.

Sulphur is commonly produced or mined by underground fusion in accordance with the well-known Frasch process. In this process a fusing fluid, such as superheated water under pressure, is conveyed to the underground sulphur deposit where its heat is utilized in fusing the sulphur and the fused or melted sulphur is collected in the so-called sulphur wells and raised to the surface of the ground in a molten condition by suitable agencies, such, for example, as an air lift pump. The molten sulphur is then permitted to solidify and forms what is known in the industry as crude sulphur.

Crude sulphur as mined by the Frasch process is more nearly a pure substance than many carefully purified chemically pure chemicals. It often assays 99.95% sulphur and averages well over 99.5% sulphur. But crude sulphur always contains, in addition to minute amounts of inorganic matter, traces of impurities which affect its burning qualities and sometimes its color. These latter impurities are largely organic matter and are present in the sulphur on account of its contact with petroleum or bituminous substances which occur in the sulphur-bearing formations. The organic impurities are usually referred to as "oil."

Ordinary crude sulphur generally assays from 0.01% to 0.05% oil, but frequently contains larger amounts of oil. There does not seem to be any direct relationship between the amount of oil present in the sulphur and its color. Sulphur containing 0.02% oil may be dark brown in color, while other sulphur containing as much as 0.07% to 0.08% oil may be a bright yellow color.

Oil and sulphur react very rapidly at the temperatures prevailing at the burning point of sulphur itself and form black, asphaltic compounds which discolor the sulphur making it nearly black, and when burned an asphaltic film forms on the surface of the sulphur which ultimately extinguishes the flame. I have found that oil and sulphur react very slowly at the temperatures ordinarily prevailing in mining operations. If, however, crude sulphur is held for some time at the temperatures prevailing in mining operations, it loses its normal bright yellow color and becomes darker yellow or brownish in color. So, in actual mining, if sulphur as it is melted in the deposit does not happen to drain readily to a producing well, it may remain in the liquid state long enough for some of the oil to react with it and cause it to lose its characteristic bright yellow color and become dark. And, should the temperature of the molten sulphur become abnormally high so that the sulphur becomes viscous, then the color of the sulphur becomes dark more rapidly. The particular shade (that is color) of the solid sulphur probably depends upon how long it had remained in the liquid state before it finally reached a producing well and was removed from the deposit and solidified, and perhaps also, to some extent, upon the temperature attained by the sulphur while molten.

While the color of crude sulphur can be fairly well controlled by careful placing of producing wells with reference to the portion of the sulphur deposit being mined, still there are often wells that produce dark or abnormally colored sulphur. In ordinary mining practice, it seems impossible not to produce some sulphur which in chemical composition and properties is practically identical with bright yellow sulphur, but which is dark or abnormal in color. The color of this dark sulphur leads those accustomed to bright sulphur to assume that it is inferior in quality and is, therefore, a drawback to the sale of a product which is equal in quality to bright yellow sulphur.

The present invention contemplates the provision of a method of treating dark or abnormally colored sulphur to improve its color and more particularly to restore dark sulphur to its normal and characteristic bright yellow color. The invention also contemplates the provision of an improved method of removing oil and similar impurities from sulphur. In its broad aspect, the invention involves treating the sulphur in a molten condition with an adsorbent material in the nature of silica gel, and subsequently separating the sulphur from the adsorbent material and such adsorbed or occluded impurities as have become associated therewith. Thus, the invention involves bringing dark colored sulphur, in a molten or liquid condition, into intimate contact with artificial silicious substances, such for instance, as silica gel, capable of adsorbing or occluding a large proportion of the oil and improving to some extent the color of the sulphur. After a varying period of contact, of from a few minutes to several hours, the sulphur is separated from the adsorptive substance and its adsorbed or occluded impurities by any appropriate means. The product is sulphur of a better color which contains noticeably less oil than before treatment.

I wish it to be understood that I do not intend to imply that the beneficial action of these artificial silicious materials is due solely to adsorption. On the contrary, it is my present belief that occlusion or absorption may and probably does take place, although to what extent the beneficial action of these materials is due, if at all, to these or other phenomena I am not now prepared to say.

I have found that silica gel possesses, to a marked extent, the properties desirable for the practice of the present invention, and under proper conditions this substance eliminates a large proportion of the oil in the sulphur and to some extent improves the color of the sulphur. The molten or liquid sulphur may be brought into the desired intimate contact with the silica gel in any convenient manner, such, for example, as by agitation with the silica gel, or by filtration through a medium composed of or appropriately containing the silica gel.

The amount of adsorbent silica gel required in the practice of my invention varies with different materials and with the amount of dark colored impurities and oil to be eliminated from the sulphur. In the case of silica gel less than 5% by weight on the amount of sulphur treated is usually sufficient to restore the color of the sulphur to the characteristic bright yellow and to remove a large percentage of the oil. In case it is desired to remove substantially all of the oil from the sulphur, larger percentages of silica gel may be required.

The temperature at which the sulphur and the adsorbent silica gel material are brought into contact may vary within wide limits. From an operation standpoint, it is preferable to bring about this contact at temperatures ordinarily now used in handling liquid sulphur, that is, from 240° to 320° F. It is to be understood, however, that higher temperatures, or even lower temperatures, may, if desired, be employed in the practice of the present invention.

The time of contact required for improving the color of sulphur and for the removal of the impurities therefrom varies with the particular substance used, with the percentage of the substance used, and with its degree of comminution. With finely divided silica gel only a few minutes are required to get effective results. With less finely divided silica gel much longer periods of contact may be required. The time of contact required will also vary with the character of the sulphur treated and with the degree to which it is desired to carry decolorization and oil removal.

The manner in which the necessary contact between the liquid sulphur and the substance used for removing the impurities is brought about may vary according to conditions. In most cases I prefer either to percolate the molten sulphur through a bed of the adsorbent material, or to agitate the molten sulphur with the adsorbent material and afterwards remove the latter by any suitable means such as by settling and decanting, filtering, centrifuging, or the like.

The activity of the adsorbent material is reduced by continued use in accordance with the invention by taking up a substantial amount of sulphur and impurities. In some cases the adsorbent material may be effectively reactivated or revivified and used again. Silica gel may be thus reactivated by heating to 800°–1200° F. in the presence of air, and may then be reused in the practice of the invention. While it seems probable that after each such reactivation there is a loss in efficiency, my investigations indicate that it is possible to reuse silica gel at least five to ten times and possibly more. The adsorbent material may also be reactivated by dissolving the adsorbed or occluded organic matter and sulphur in a suitable solvent, such, for example, as carbon bisulfide or carbon tetrachloride.

The invention will be further illustrated by the following example:—

*Example No. 1.*

Agitation with adsorbent substance followed by filtration.

50 grams of very dark sulphur (6) assaying 0.08% oil were agitated with 3% by weight of 200 mesh silica gel for about five minutes at a temperature of about 260° F. The resulting mixture was filtered through filter paper. The sulphur filtrate was very bright in color (1) and assayed less than 0.01% oil.

The results of three tests employing powdered silica gel are tabulated below showing the remarkable results obtained even with percentages of silica gel as low as one per cent. The procedure was similar to the procedure followed in Example No. 1 with the exception that the period of agitation was longer.

| Percent silica gel | Time agitated | Filtered product | |
|---|---|---|---|
| | | Percent oil | Color No. |
| Crude sulphur | | 0.044 | 9 |
| 1 | 30 min | 0.009 | 2 |
| 2 | do | 0.006 | 2 |
| 5 | do | 0.003 | 2 |

Silica gel in the form of granules is not so effective as when used as a powder. The smaller the granules the more effective the material becomes as an adsorbent agent. When silica gel is used in the form of granules the granules are not agitated with the melted sulphur but the granules are used as a filter bed. In practice it has been found advantageous to use granular silica gel of from thirty to sixty mesh. Material of a finer mesh than sixty slows up the rate of percolation to such an extent that its use is uneconomical, while the use of coarser material necessitates the use of an abnormally thick filter bed or gives poor adsorptive results.

There being no standard method of determining the gradations of discoloration of sulphur an arbitrary system has been devised and standardized. Long familiarity with these samples enables one to accurately gauge the color of a sample without even a check comparison with the standards maintained for that purpose.

The standards as far as it is possible to describe the colors are as follows:

| Color No. | Ordinary description |
|---|---|
| 1 | Very, very bright. |
| 2 | Very bright. |
| 3 | Bright. |
| 4 | Fairly dark. |
| 5 | Dark. |
| 6 | Very dark. |

From color No. 6 on to No. 10 the shades are proportionately darker.

The action of the silica gel adsorbent is graphically illustrated in Figs. 1 and 2 of the accompanying drawings.

Figure 1:
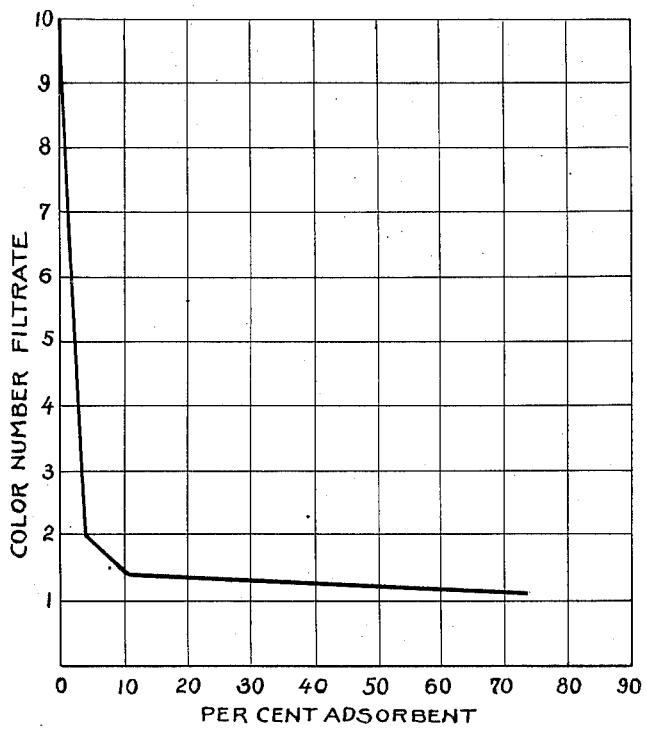
Fig. 1 represents the plotted line of a dark colored sulphur with a color number 10 which is treated with various amounts of the adsorbent reagent.
Figure 2:
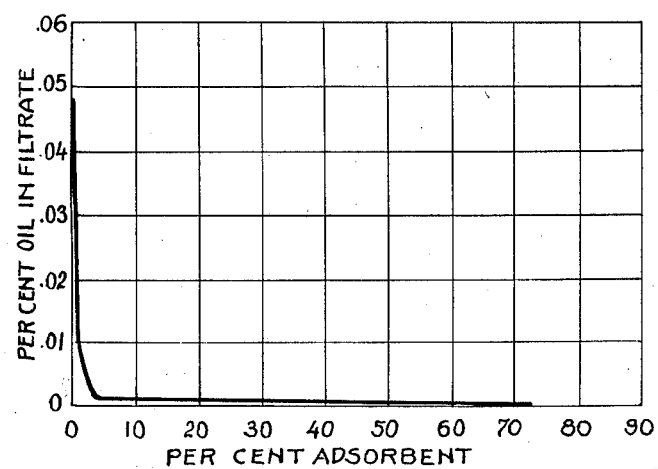
Fig. 2 represents graphically by a plotted line the presence of oil which is removed by varying amounts of the adsorbent reagent.

Both of the drawings show that percentages of adsorbents below 5% remove most of the color and oil while the remaining traces of oil and color are only removed by a large excess of the adsorbent reagent.

Throughout the preceding description, particular stress has been laid on the application of the invention to the improvement in the color of off-color sulphur. It should be noted, however, that the principles of the invention may be advantageously applied in the refining of sulphur. Thus, the invention may be effectively used in removing oil and similar impurities from sulphur of satisfactory color. In fact, my investigations have indicated that by the practice of the invention, using silica gel results may be obtained substantially equal to those obtained by the usual method of subliming. Silica gel appears to have a preferential action in the adsorption reaction, that is, the silica gel seems to pick up the oil more readily than it does the impurity which causes the darkening of the sulphur that is the reaction product between oil and sulphur. Thus, it may be found advantageous to use mixtures of silica gel with other adsorbents depending upon the silica gel to remove a preponderance of the oil present and depending upon one of the other preferential adsorbents to remove the dark colored reaction product. Thus, by using such a combination, sulphur may be substantially freed from oil and by the same process have its color considerably brightened.

I claim:

1. The method of improving the color of abnormally colored sulphur which comprises treating the sulphur in a molten condition with finely divided silica gel, and separating the molten sulphur from the silica gel and thereby obtaining sulphur of a color substantially approximating the characteristic normal yellow color.

2. The method of improving the color of abnormally colored sulphur which comprises passing the sulphur in a molten condition through an appropriate bed containing silica gel whereby the molten sulphur is brought into intimate contact with the silica gel and the sulphur after passing therethrough is more nearly of the characteristic yellow color of normal colored sulphur.

3. The method of treating sulphur containing impurities, such as small amounts of organic matter, which impart to the sulphur an abnormal color, which comprises bringing the sulphur in a molten condition into intimate contact with silica gel, and separating the molten sulphur from the silica gel and thereby obtaining sulphur of a color substantially approximating the characteristic normal yellow color.

4. The method of treating sulphur containing impurities, such as small amounts of organic matter, which impart to the sulphur an abnormal color, which comprises agitating the sulphur while molten in the presence of finely divided silica gel, and separating the molten sulphur from the silica gel and thereby obtaining sulphur of a color substantially approximating the characteristic normal yellow color.

5. The method of treating sulphur containing impurities, such as small amounts of organic matter, which impart to the sulphur an abnormal color, which comprises passing the sulphur while molten through a medium containing finely divided silica gel and thereby substantially improving the color of the sulphur and removing from the sulphur a substantial portion of the impurities.

6. The method of treating sulphur containing impurities, such as small amounts of organic matter, which impart to the sulphur an abnormal color, which comprises bringing silica gel into intimate contact with the sulphur at a temperature from about 240° F. to about 320° F., and separating the molten sulphur from the silica gel and thereby obtaining sulphur of a color substantially approximating the characteristic normal yellow color.

7. The method of treating sulphur containing contaminating constituents, such as small amounts of organic impurities, which impart to the sulphur an abnormal color, which comprises bringing silica gel which has been previously subjected to a temperature of about 800° F. to about 1200° F. in the presence of air into intimate contact with the sulphur while molten, and separating the molten sulphur from the silica gel and thereby obtaining sulphur of a color substantially approximating the characteristic normal yellow color.

8. The method of improving sulphur containing contaminating impurities, which comprises bringing the sulphur in a molten condition into contact with silica gel, and subsequently separating the molten sulphur from the silica gel and the impurities associated therewith.

9. The method of treating sulphur containing contaminating impurities which comprises passing the sulphur in a molten condition through a medium containing silica gel and thereby removing a large part of the contaminating impurities from the sulphur.

10. The method of improving the color of abnormally colored sulphur which comprises treating the sulphur in a molten condition with artificial silicious adsorbent material, and separating the molten sulphur from the adsorbent material and thereby obtaining sulphur of a color substantially approximating the characteristic normal yellow color.

11. The method of treating sulphur containing impurities, such as small amounts of organic matter, which impart to the sulphur an abnormal color, which comprises bringing an artificial silicious adsorbent material into intimate contact with the sulphur at a temperature from about 240° F. to about 320° F., and separating the molten sulphur from the adsorbent material and thereby obtaining sulphur of a color substantially approximating the characteristic normal yellow color.

12. The method of treating sulphur containing contaminating impurities, which comprises bringing the sulphur in a molten condition into contact with an artificial silicious adsorbent material, and subsequently separating the molten sulphur from the silicious adsorbent material and the impurities associated therewith.

In testimony whereof I affix my signature.

JAMES W. SCHWAB.